United States Patent [19]
Lin

[11] Patent Number: 6,155,366
[45] Date of Patent: Dec. 5, 2000

[54] AUXILIARY ELECTRIC DRIVING SYSTEM FOR VEHICLE

[76] Inventor: Yu Tsai Lin, No. 35, Lane 11, Sec. 5, Fu An Road, Tainan, Taiwan

[21] Appl. No.: 09/170,684

[22] Filed: Oct. 13, 1998

[51] Int. Cl.[7] ................................................ B60K 6/04
[52] U.S. Cl. .................................... 180/65.2; 180/230
[58] Field of Search ........................ 180/65.1, 65.2, 180/65.5, 220, 230, 206, 54.1, 907

[56] References Cited

U.S. PATENT DOCUMENTS

| | | | |
|---|---|---|---|
| 1,259,470 | 3/1918 | Avoscan | 180/180 |
| 4,368,795 | 1/1983 | Tidwell | 180/212 |
| 4,461,365 | 7/1984 | Diggs | 180/11 |
| 4,745,994 | 5/1988 | Tsuchida | 188/181 A |
| 5,125,469 | 6/1992 | Scott | 180/65.2 |
| 5,152,361 | 10/1992 | Hasegawa et al. | 180/230 |

*Primary Examiner*—J. J. Swann
*Assistant Examiner*—Bridget Avery
*Attorney, Agent, or Firm*—Charles E. Baxley

[57] ABSTRACT

A vehicle includes a wheel axle and an engine coupled to the wheel axle for driving the wheel axle, and an auxiliary electric driving device is further coupled to the wheel axle for selectively driving the wheel axle. The auxiliary electric driving device includes a motor for driving the wheel axle when the vehicle moves in a downtown area or in a low speed, so as to prevent the engine from generating exhaust gas. The fuel engine may be actuated when the vehicle moves in suburban area or in a high speed, for allowing the fuel to be completely burned.

6 Claims, 3 Drawing Sheets ized bicycle.

AUXILIARY ELECTRIC DRIVING SYSTEM FOR VEHICLE

BACKGROUND OF THE INVENTION

1. Field of the Invention

The present invention relates to a vehicle, and more particularly to an auxiliary electric driving system for a vehicle, particularly a motor cycle or a motorized bicycle.

2. Description of the Prior Art

Typical vehicles, particularly the motor cycles or the motorized bicycles, comprise a fuel engine for driving the motor cycles. The fuel may not be burned completely when the motor cycles move in the downtown area or move in a low speed. The incompletely burned fuel may generate an exhaust gas that may seriously pollute our environment. In order to solve the exhaust gas problem, electric motor cycles or electrically driven bicycles are generated. However, at present, many problems are still required to be solved before the motor cycles can be driven by electric motors only.

The present invention has arisen to mitigate and/or obviate the afore-described disadvantages of the conventional vehicles.

SUMMARY OF THE INVENTION

The primary objective of the present invention is to provide a vehicle including an auxiliary electric driving system for driving the vehicle in addition to the typical fuel engine.

In accordance with one aspect of the invention, there is provided a vehicle comprising an engine coupled to a wheel axle for driving the wheel axle, and an auxiliary electric driving means for selectively driving the wheel axle.

The engine includes an output shaft, the engine coupling means includes a first rotary member secured to the output shaft of the engine, and includes a second rotary member secured to the wheel axle, and includes a coupling member engaged over the first and the rotary members for coupling the first and the rotary members together and for allowing the engine to drive the wheel axle. The first and the second rotary members are pulleys, and the coupling member is a belt. The engine coupling means includes a unidirectional mechanism provided between the wheel axle and the second rotary member for allowing the wheel axle to be driven unidirectionally by the engine.

The auxiliary electric driving means includes a motor having an output spindle, and means for coupling the output spindle to the wheel axle and to drive the wheel axle. The output spindle coupling means includes a unidirectional mechanism provided between the wheel axle and the second rotary member for allowing the wheel axle to be driven unidirectionally by the motor.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
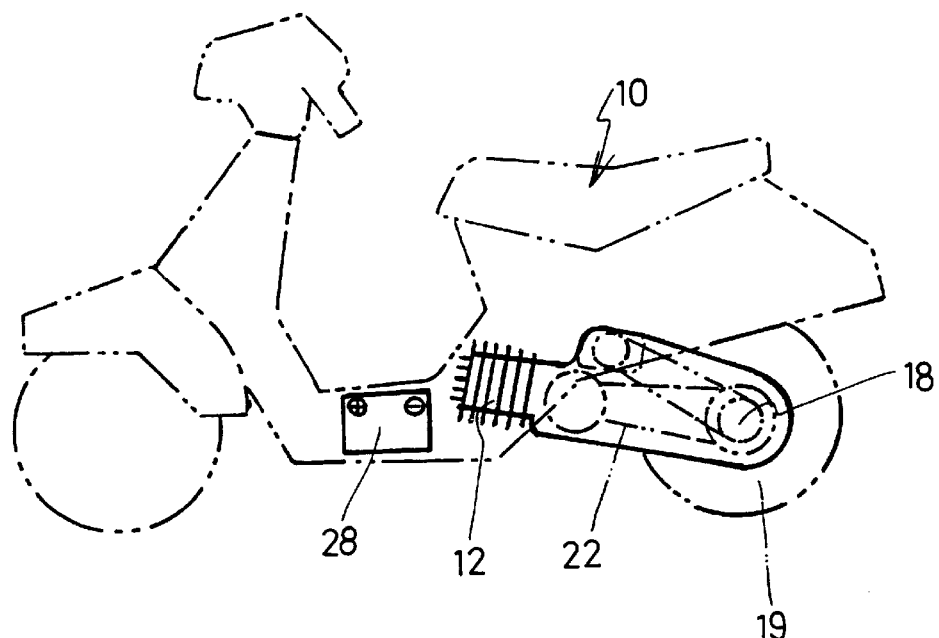
FIG. 1 is a front view of a driving system for a vehicle in accordance with the present invention.
Figure 2:
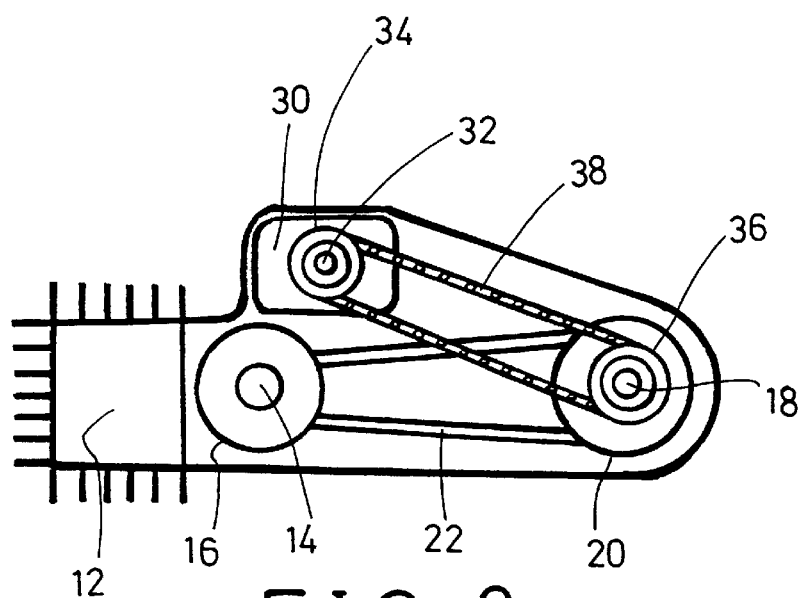
FIG. 2 is an enlarged front view of the driving system for the vehicle.
Figure 3:
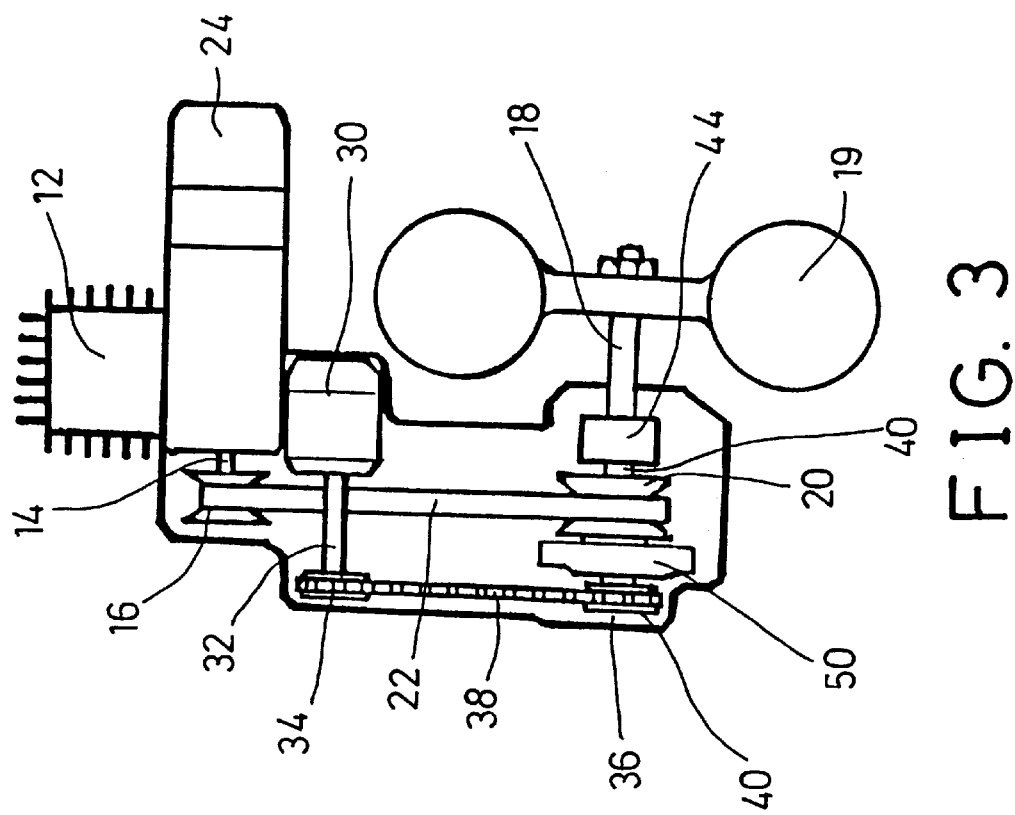
FIG. 3 is a schematic view of the driving system for the vehicle.

Referring to the drawings, and initially to FIGS. 1–3, a vehicle 10 in accordance with the present invention comprises a typical fuel engine 12 including an output shaft 14 having a rotary member, such as a sprocket or a pulley 16 secured thereon. The vehicle 10 includes a wheel axle 18, particularly the rear wheel axle 18, rotatably secured to the vehicle 10, and a wheel 19 secured to the wheel axle 18 and rotated in concert with the wheel axle 18. Another rotary member, such as a sprocket or a pulley 20 is secured to the wheel axle 18. A chain or a V-belt 22 is engaged over the sprockets or the pulleys 16, 20 for allowing the engine 12 to drive the wheel axle 18. A generator 24 is coupled to the engine 12 for generating electricity and for energizing the ignition system, the electric lights, and the head lights etc. of the vehicle. The vehicle 10 includes a battery 28 coupled to the generator 24 for being charged by the generator 24.

The present invention further includes an electric motor 30 having an output spindle 32 and having a rotary member, such as a pulley or a sprocket 34 secured on the spindle 32 for being driven by the motor 30. Another rotary member, such as a pulley or a sprocket 36 is secured on the wheel axle 18 and coupled to the pulley or sprocket 34 by a belt or by a chain 38, for allowing the wheel axle 18 to be driven by the motor 30. The motor 30 may include an initial output power up to 3000 W when the motor 30 is first actuated and may include an output power up to 4 horse power (hp) which is good enough for driving the motor cycles.

Referring next to FIGS. 4 and 5, and again to FIG. 3, two unidirectional mechanisms 40 are provided between the wheel axle 18 and the pulley 20 and the sprocket 36 respectively. The pulley 20 and the sprocket 36 each includes two or more ratchet recesses 46, and the unidirectional mechanisms 40 each includes a ball or a roller 48 received in the respective ratchet recesses 46, for allowing the wheel axle 18 to be driven unidirectionally by the pulley 20 or by the sprocket 36. An electric generator 44 may further be provided on the wheel axle 18 for being driven by the wheel axle 18 and for generating electricity which may also be charged into the battery 28. The generator 44 preferably generates the electricity at a rate of about 15 A/hr.

Figures 4, 5:
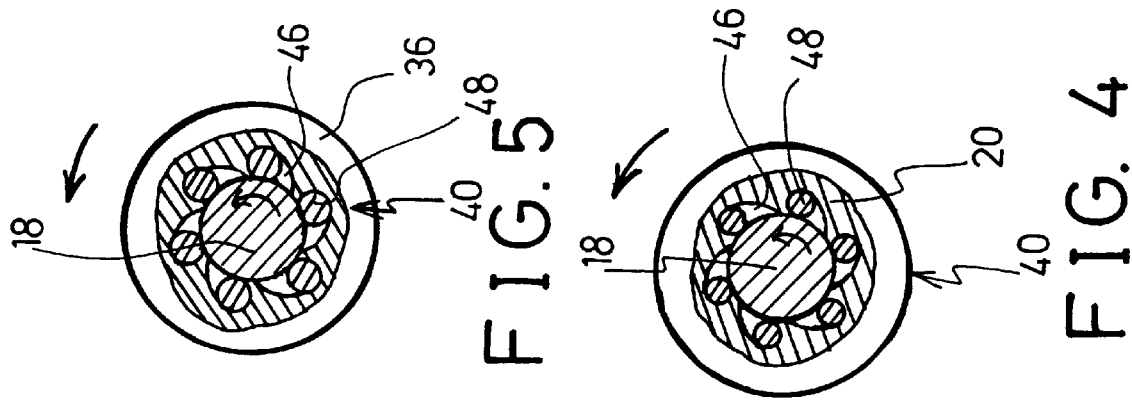
FIGS. 4, 5 are partial cross sectional views illustrating the unidirectional mechanism of the vehicle.
Figure 6:
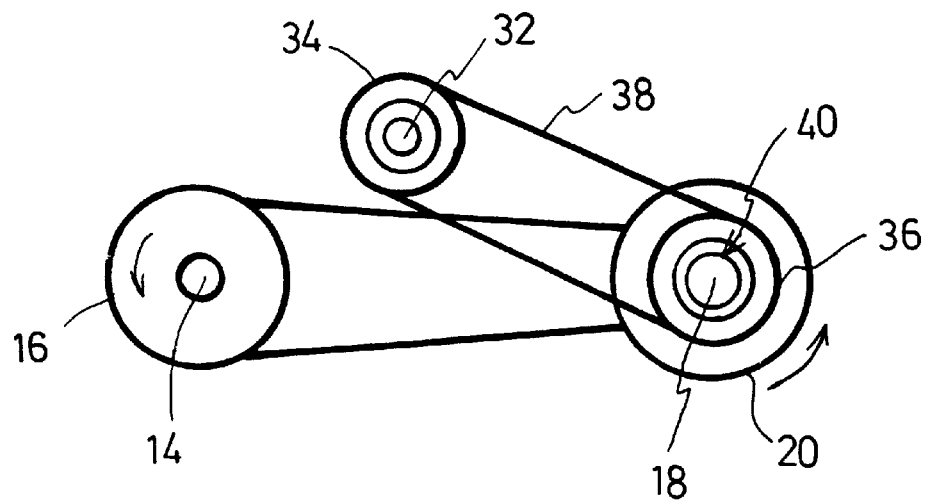
FIGS. 6 and 7 are schematic views illustrating the operation of the driving system for the vehicle.
Figure 7:
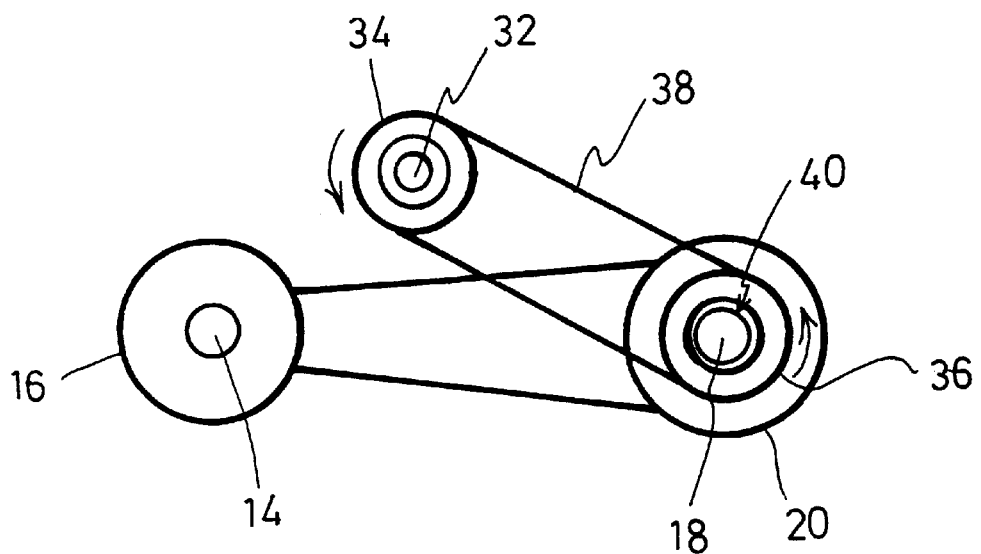

In operation, as shown in FIGS. 4 and 6, when the engine 12 is actuated, the wheel axle 18 may he driven counterclockwise by the engine 12 via the pulleys 16, 20 and the belt 22, such that the vehicle may be driven by the engine 12. At this moment, as shown in FIG. 5, when the wheel axle 18 is driven counterclockwise by the engine 12, the sprocket 36 will not be driven counterclockwise by the wheel axle 18. Alternatively, as shown in FIGS. 5 and 7, when the motor 30 is actuated, the wheel axle 18 may be also driven counterclockwise by the motor 30 via the sprockets 34, 36 and the chain 38, such that the vehicle may also be driven by the motor 30. At this moment, as shown in FIG. 4, when the wheel axle 18 is driven counterclockwise by the motor 30, the pulley 20 will not be driven counterclockwise by the wheel axle 18, such that the wheel axle 18 may be driven by the engine 12 or by the motor 30 independently. The user may preferably actuate the motor 30 to drive the vehicle 10 first when the vehicle 10 moves in downtown area or when the vehicle 10 moves in a lower speed. When the vehicle 10 moves in the suburban area or when the vehicle has been moved or driven in a fast speed, the user may then actuate the engine 12 to drive the vehicle. The fuel of the engine 12 may be completely burned when the vehicle moves in a fast speed.

Alternatively, the wheel axle 18 may be driven by the engine 12 via a sprocket and chain mechanism, and the may be driven by the motor 30 via a pulley and belt mechanism.

As shown in FIG. 5, a clutch device 50 may further be provided and disposed on the wheel axle 18 and disposed between the pulley 20 and the sprocket 36 and may be provided for allowing the wheel axle 18 to be driven by the engine 12 automatically when the vehicle has been moved or driven in a fast speed.

Accordingly, the vehicle in accordance with the present invention includes an auxiliary electric driving system for driving the vehicle in addition to the typical fuel engine.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle comprising:

a wheel axle for supporting a wheel thereon.

an engine, engine coupling means for coupling said engine to said wheel axle to drive said wheel axle, and auxiliary electric driving means for selectively driving said wheel axle, said auxiliary electric driving means including a motor having an output spindle, and output spindle coupling means for coupling said output spindle to said wheel axle to drive said wheel axle, said output spindle coupling means including a first rotary member secured to said output spindle of said motor and including a second rotary member secured on said wheel axle, and including a coupling member engaged over said first and said second rotary members for coupling said first and said second rotary members together and for allowing said motor to drive said wheel axle.

2. The vehicle according to claim 1, wherein said engine includes an output shaft, said engine coupling means includes a first rotary member secured to said output shaft of said engine, and includes a second rotary member secured to said wheel axle, and includes a coupling member engaged over said first and said second rotary members for coupling said first and said second rotary members together and for allowing said engine to drive said wheel axle.

3. The vehicle according to claim 2, wherein said first and said second rotary members are pulleys, and said coupling member is a belt.

4. The vehicle according to claim 2, wherein said engine coupling means includes a unidirectional mechanism provided between said wheel axle and said second rotary member for allowing said wheel axle to be driven unidirectionally by said engine.

5. The vehicle according to claim 1, wherein said first and said second rotary members are sprockets, and said coupling member is a chain.

6. The vehicle according to claim 1, wherein said output spindle coupling means includes a unidirectional mechanism provided between said wheel axle and said second rotary member for allowing said wheel axle to be driven unidirectionally by said motor.

* * * * *